June 5, 1945.  J. J. FELSECKER  2,377,545
LIQUID TREATMENT
Filed July 6, 1942  2 Sheets-Sheet 1
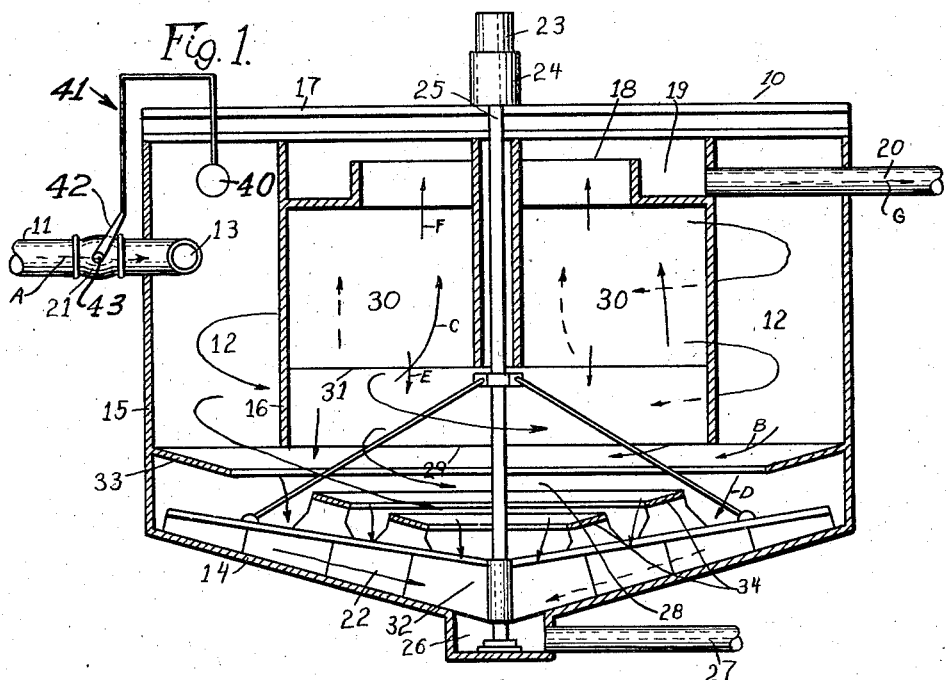
Fig. 1.
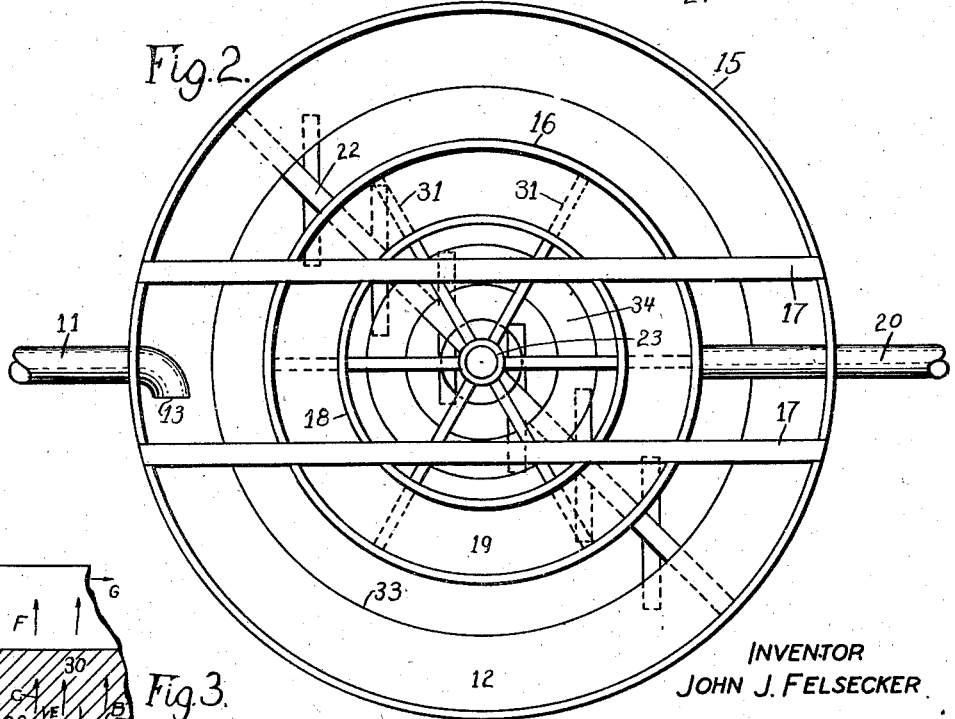
Fig. 2.
Fig. 3.
INVENTOR
JOHN J. FELSECKER
BY F D Prayer
ATTORNEY June 5, 1945.   J. J. FELSECKER   2,377,545
LIQUID TREATMENT
Filed July 6, 1942   2 Sheets-Sheet 2
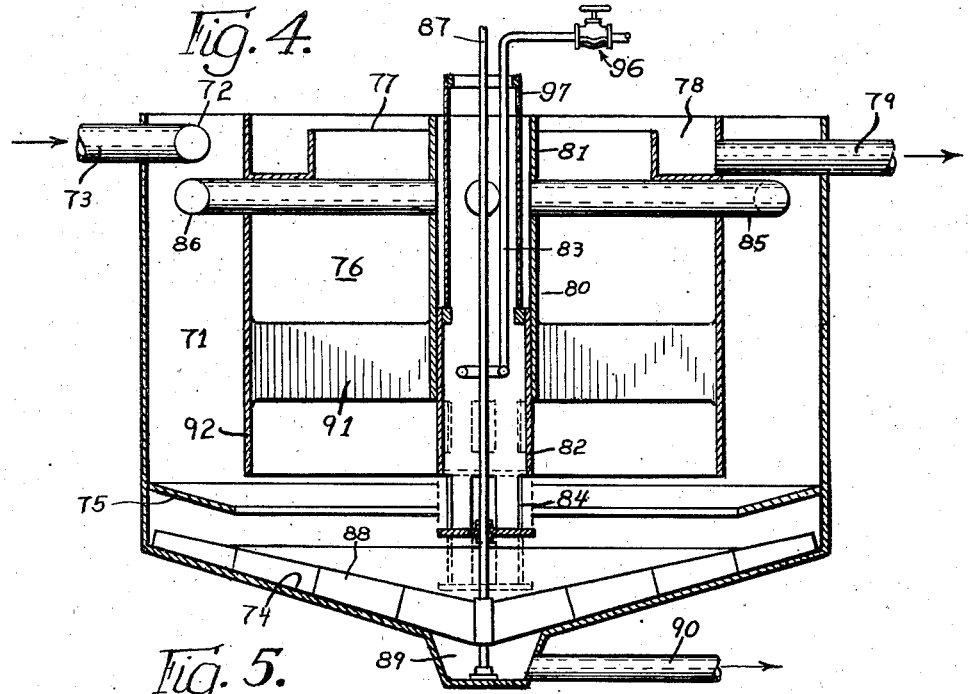
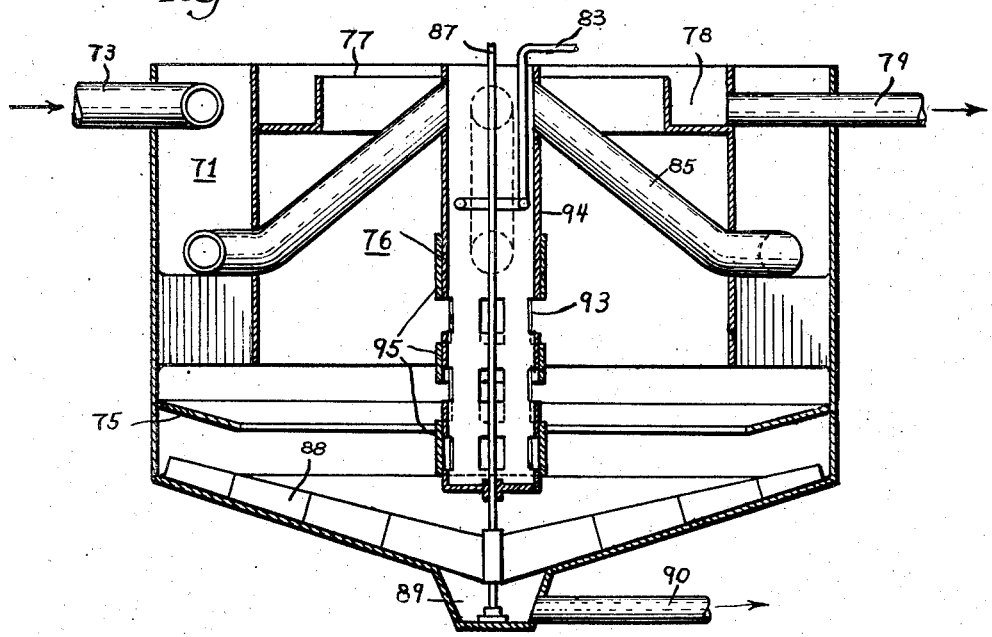
INVENTOR
JOHN J. FELSECKER Patented June 5, 1945

2,377,545

UNITED STATES PATENT OFFICE 2,377,545

LIQUID TREATMENT

John J. Felsecker, Calumet City, Ill., assignor to Graver Tank & Mfg. Co., Inc., a corporation of Delaware Application July 6, 1942, Serial No. 449,968

4 Claims. (Cl. 210—16)

This invention relates to liquid treatment and particularly to the removal of suspended, colloidal, or dissolved solids from liquids by chemical and physical treatment, with clarification by sludge filtration and sedimentation. The softening of water by an improved lime-soda process is typical for many applications of the invention, and special reference will be had to this application, which illustrates the invention but is not intended to limit the same.

It is an object of this invention to provide an improved method and apparatus capable of purifying a liquid of solids contained and formed therein, where some of said solids, which are present at certain points, are more settleable than others.

Another object is to provide filtration of the liquid being treated through some of said solids, which are kept in suspension, forming a sludge blanket, this sludge blanket being initially built up from the bottom of the tank, and being so disposed in normal operation as to merge with a subjacent zone of solids settled from the liquid, provision being made, however, so that the flow wherein the sludge filtration occurs may not disturb the settled solids.

Another object is to provide flow guiding means functionally separating the blanket from the settled solids but allowing gravitational communication of solids and supernatant liquid between the sludge blanket and the bottom sediment zone.

Another object is to cause a mixture of liquid and solids to flow as a distributing flow through a liquid body, spaced above the bottom and below the top of the liquid body, to control or adjust the agitative effect of the solids distributing flow on solids present above and below the same so as to suspend small and medium particles above the same and to settle large particles below the same, and to clarify the liquid by sludge filtration in a flow upwardly branching off from the distributing flow, and by sedimentation of solids below the distributing flow.

According to a particular feature I may recirculate parts of said distributing flow into the mixture to be introduced, whereby changes in the flow rate of the mixture may be compensated for, the distribution of liquid and solids in the solids blanket may be improved, precipitation and flocculation promoted by sludge recirculation, and other advantages obtained.

Other objects are to provide favorable conditions for the sludge blanket and other operative zones and parts of the liquid, as well as suitable means for controlling, guiding, stilling, or segregating the fluid flows, suitable passages and openings for the circulating flows, means for adjusting the distance or relationship between the solids distributing flow and adjacent fluid bodies, and other necessary or desirable equipment.

Still other objects and advantages may appear on consideration of this disclosure.

In the drawings,

Figure 1 is a cross-sectional elevation of apparatus embodying this invention.

Figure 2 is a plan view of the apparatus shown in Figure 1.

Figure 3 is a diagram of liquid flows in the apparatus of Figures 1 and 2.

Figure 4 is a cross-sectional elevation of modified apparatus embodying this invention.

Figure 5 is a similar view of a further modification of the apparatus shown in Figure 4.

The tank 10 receives the newly introduced hard water, previously dosed with any required softening and coagulating chemicals or other precipitants, through an inlet conduit 11 which terminates in a zone 12 forming part of the tank and serving for primary precipitating treatment. The tank is round in plan view and the primary precipitation zone 12 is in effect an annular well or channel in the outer part of this tank. The inlet conduit discharges into this primary annular well through one or more tangential openings 13 so that the liquid horizontally circulates through the primary well, whereby it is distributed over the whole area of the primary well, and simultaneously subjected to gentle agitation, conducive to flocculation. The general direction of the flows is indicated by arrows, in Figure 1.

The primary well 12 is formed by the outer, peripheral wall 15 of the tank and an inner, annular wall or baffle 16, which is concentric with the tank. This inner, annular wall may be suspended from beams 17 spanning the tank. It reaches from the top of the tank downward to a point spaced above the bottom 14 of the tank.

On the inside of the inner annular wall 16, and adjacent to its top, there is an annular overflow weir 18 providing for the discharge of softened and clarified water into a circular launder 19 discharging through an effluent conduit 20. The weir determines the lowest point to which the liquid level in the tank can fall in operation, except when the tank is drained for cleanout or repair. An upper limit for the liquid level in the tank may be established by a float valve 21 in the inlet conduit 11, in well-known manner.

The water received through the inlet 13 may carry flocculent material, and flocs will be precipitated as the water flows through the tank. The process carried out in this tank is of the type wherein small and medium sized flocs are carried along by the liquid flow, while large solids or flocs settle to the tank bottom 14. This settling of flocs may start in the primary well 12, and flocs may settle on the bottom below that well. This bottom is substantially flat, especially in large tanks. Portions of the settled solids are continuously picked up and laterally removed by scrapers 22, which slowly rotate over the bottom 14, being driven by a motor 23 and speed reducer 24, through a central vertical shaft 25. The solids removed by the scrapers are received in a central sump 26 from which they are ultimately withdrawn, in well-known manner, through a conduit 27.

The water carrying all the flocs except the largest, which have settled out in the primary well 12, spirals horizontally inward into and through the distribution zone 28, passing first below the lower edge 29 of the annular wall 16 and finally upward, through the sludge filtration zone 30. The distribution zone 28 is located in the space inside of the wall 16 at an elevation adjacent to that of the lower edge 29 of said wall, while the sludge filtration zone 30 extends upwardly from this distribution zone, inside of the wall 16. The rotation of the liquid continues in the distribution zone. It is an aid to flocculation. It also serves to freely distribute liquid and solids over the tank area. Therefore this rotation may be allowed to continue at least in a part of the upward flow through the sludge filtration zone 30. However, ultimately this rotation may be stilled by vertical radial baffles 31 which extend inward from the wall 16. Thereupon, the further upward flow is substantially straightlined and vertical.

A sludge filter or blanket is built up in the upward flow through the central zone 30. The treatment of the water is completed in this sludge filter. Treated water emerges from the sludge filter and overflows over the weir 18. The solids or flocs agglomerate, and are ultimately removed by settling down through the sludge filtration and distribution zones 30 and 28 into a quiescent sediment zone 32 which extends downwardly from the distribution zone 28 to the bottom of the tank.

Quiescent conditions are maintained in this sediment zone 32, and not allowed to be disturbed by the spiralling, distributing flow in the superposed distribution zone 28, by means of a liquid guiding baffle member 33 inwardly extending from the tank wall 15 at an elevation adjacent to, and slightly below, the lower edge 29 of the inner annular wall 16, and above the tank bottom 14. This baffle causes the spiralling flow to be deflected inwardly, adjacent to the lower edge 29, so that it may not disturb the sediment deposited on the tank bottom 14. Of course an outer part of this baffle may merge into the wall 15. The baffle 33 preferably extends only a short distance inward from the tank wall 15; but additional horizontally extending baffles 34 may be provided in line with the baffle 33, aiding further to maintain quiescence in the bottom zone 32. Such baffles 34 may be carried by the slowly rotating scraper structure 22, or in any other suitable manner. They may be annular, or of any other suitable shape. All of these horizontally extending baffles may also have vertical inclination, or at least their upper surfaces should be inclined, so that they may allow the sliding off by gravity of conglomerates of settling flocs. This sliding off is also promoted by the aforementioned spiral flow above the baffles 33 and 34.

For a complete understanding of the operation of my improved process and apparatus, it must be considered that, when softening reagents are added to a hard water, the resulting solid precipitates or flocs of hardness constituents are formed at different rates, velocities, and degrees of completeness. Some calcium carbonate flocs of fair size may appear after a few minutes, whereas other solid particles of the same substance may appear only after many hours. Also, some of said flocs, as originally formed may be large or heavy, whereas other solids of the same chemical composition, may be exceedingly small or light when originally formed. At every point of a liquid flow containing such precipitates in process of formation, treatment, or removal, there will be found some such precipitates which are relatively large, heavy, prematurely formed, and readily settleable and others of intermediate size, weight, and settling characteristics. There may be still others which are so light, small, or incomplete as to settle relatively slowly or not to settle at all. In connection with the latter group, there may be mentioned those hardness constituents which are still present in a dissolved or similar state, which have not completed their chemical reaction with the softening, precipitating, or coagulating reagents, or which have not completed the physical reaction of precipitation or flocculation incident to which they appear for the first time as suspended, solid particles or flocs.

In the early stages of this art, the water to be softened was treated and detained for several hours, in order that even the last of the solid precipitates might have a chance to be formed and completed. The treatment was either intermittent or continuous. Later on, attempts were made, both in intermittent and continuous plants, to accelerate the process, especially by contacting the water and the relatively incomplete precipitates with a retained or recirculated sludge of previously formed, completed precipitates.

In accordance with a more recent method, which is further improved hereby, the water and the relatively incomplete precipitates are continuously contacted with a retained sludge of previously formed precipitates of intermediate size and weight; the largest, heaviest, completed precipitates being removed by sedimentation, as soon as they have been formed. In this process, a liquid particle may pass through the tank in an average period of one hour or less. During a first part of this period, flocs may be originally formed, by primary precipitation in the liquid particle. During the greatest part of this time the liquid particle, carrying a continuously decreasing amount of solids, percolates through the sludge blanket; that is, through a retained mass of solids previously formed and being newly formed, agglomerated, and increased in size. A small solid particle originally formed in the primary flow may be present in this mass for many hours, or even days, during which time it generally increases in size due to agglomeration with other particles previously formed or being newly formed. The larger a particle becomes, the more it tends to subside in the mass or blanket of particles. Occasionally, particles will be partly broken up, when engaged by rapid portions of the spirally rotating flow; whereupon they may tend to rise again. The spirally rotating flow of this invention, as stated before, is upwardly spaced and functionally separated from the quiescent sedimentation zone, and thus disturbance of the sedimentation zone is prevented. The particles are ultimately agglomerated into large, heavy, and well coagulated flocs, which are no longer readily subject either to disintegration or to growth under the conditions of the process. These are no longer retained in the sludge blanket, but removed by sedimentation. As they settle through the sludge blanket and into the subjacent sediment zone they displace liquid upwardly. These downward and upward exchanges or movements are preferably allowed to occur throughout the whole area of the sludge blanket, or at least in substantial parts thereof, so as to facilitate and accelerate the gravitational separation of the large, heavy, and complete flocs from the sludge retained in the filter or blanket.

In order to start the operation I fill the tank 10 with water to the level of the overflow weir 18. Thereafter, I continuously add water and chemicals through the inlet 13 and withdraw equal amounts of water through the effluent pipe 20. In the beginning, the chemical treatment results in conditions which are none better than those obtained in earlier softening apparatus; and for this reason, the initial rate of flow or throughput through the tank must be kept very slow, that is, ordinarily less than one gallon per square foot of tank area per minute. With higher initial flow rates, most of the flocs formed would be entrained and carried out with the water overflowing over the weir 18, and no sludge bed could be formed except after an excessively long period of initial treatment, covering many days. The desirable, slow, initial rate of flow may be enforced by proper adjustment of the inlet float valve 21, which may be actuated by a float 40 through a linkage 41 comprising a crank 42 which is angularly adjustable on the valve stem 43; or adjustment may be obtained in other suitable ways. Even with such slow rates of initial flow, many of the flocs initially formed are and remain so small that they are carried out over the weir 18. For this reason the water discharged during initial operation is generally unsatisfactory for such use or consumption as may be contemplated for the water when fully treated in accordance with this invention.

Flocs of calcium carbonate and the like will settle from the slow, initial flow, to the tank bottom 14. Preferably, during initial operation, these flocs are not removed through the sludge sump 26 and the pipe 27. The scrapers 22 may be kept at rest, or I may rotate them from time to time, at a very slow rate and for short periods only, so as to spread out the sludge over the whole of the tank bottom and to prevent the sludge from compacting too much. Gradually, the whole of the sediment zone 32 may be filled with settled sludge.

As the operation continues the sludge sediment tends to be built up above the bottom zone 32, into the distribution zone 28. From this moment on, the rate of flow is increased, by proper readjustments of valve 21 or of any other control means, so that the sludge present in the distribution zone 28 is largely re-suspended and the newly entering sludge is largely held in suspension, and parts thereof are carried into the superimposed zone 30, starting the formation of a suspended sludge blanket. Of course the chemical dosage is increased proportionally. Caution must be applied to avoid any excessive or abrupt re-adjustment of valves, leading to a sudden or excessive increase in the rate of flow, which would cause the suspended flocs to be entrained and carried out over the weir 18. It must be understood that at this point, the initial treatment is not fully completed yet. The bulk of the initial sludge filter consists of small flocs, and this initial filter cannot be expected to provide complete treatment at a high flow rate. The flow rate may be raised gradually, and it must be anticipated that for a short time after each increase, the overflow will contain relatively more small flocs again.

Gradually, however, the overflow will become clear, and thereafter it will remain clear, even upon a further increase of the flow rate within certain limits. This is due to the fact that the beneficial effects of the sludge blanket start to play their part; and the flocs in the sludge blanket itself become larger and heavier. A further increase in the rate of throughput, as mentioned, becomes feasible; in fact, it is desirable, in order to keep a sufficient supply of flocs in suspension, and to prevent depletion of the sludge blanket.

Pursuant to this final increase of the throughput rate, the operation may be considered normal, and may be continued indefinitely. From this moment on, sludge must be withdrawn through the pipe 27 at substantially the same rate at which new sludge is deposited.

The sludge blanket in the filtration zone 30 according to the present invention contains only, or at least primarily, the sludge which fails to settle into the sediment zone 32; that is, the flocs of small and medium size, which are readily subject to growth and agglomeration under the conditions of the process. The flow conditions affecting and surrounding this improved sludge bed in normal operation, are diagrammatically shown in Figures 1 and 3. The flow A which passes into and through the primary precipitation zone 12, enters the distribution zone 28, wherein it is continued by a horizontal, preferably spiral flow B, bringing liquid and solids to all points below and in the sludge blanket. The sludge blanket as a whole is more or less stationary in the superposed sludge filter zone 30. At all points of the distributing flow B, upward flows C are branched off therefrom, which enter the superposed sludge filter for final treatment therein.

The liquid in the spiral flow B passing through the distributing zone 28 contains precipitated flocs as well as particles just being precipitated, and perhaps dissolved particles the precipitation of which has hardly started. The upward flows C carry the said particles into the sludge filter, which as mentioned consists of generally similar particles, of small and medium size. The liquid percolates through this sludge filter. Incident to this percolating flow, both precipitation and flocculation are promoted and completed.

The largest precipitated and flocculated particles contained in the flow B are constantly settled out, as shown at D. Furthermore, the largest precipitated and flocculated particles formed in the sludge filter zone 30 are constantly settled out as shown at E. Other flocs and particles tending to turn into flocs, are continuously resupplied to the sludge filter, by the flow A from the primary precipitation zone 12. They are uniformly distributed by the flow B, without undue disturbance of the quiescent zone 32.

Practically all the impurities contained in the liquid entering the sludge filter are effectively removed from the liquid in the sludge blanket, including even the smallest particles and the solids most difficult to precipitate in settleable form. Such small particles and incomplete precipitates are agglomerated with and thus retained by the medium and small sized, suspended flocs forming the sludge filter. As a result, there is a continuous growth of the suspended flocs forming the sludge filter. The smallest and least complete flocs, originally entrained and introduced into the filter, disappear during this upward flow, and a well softened, clarified and stabilized water, causing no after-precipitation on continued detention or flow, emerges at F, to be withdrawn at G.

Flocs which have reached a large size, are no longer suspended, and of course not entrained, by the upward flow C; they settle down to the tank bottom. No attempt is made to hold them in suspension. They settle through the distribution zone 28, where they may be engaged, partly broken up and resuspended by the spiral flow, for a while; but they ultimately settle further into the sediment zone 32, and are removed by the scrapers 22, at H.

When reference is had to flocs of certain sizes, of course it will be understood that generally speaking, the largest flocs are also the heaviest ones, and settle more rapidly, or overcome an upward liquid velocity more easily than other, smaller and lighter flocs. Other features than size and specific weight may affect the settleability of the flocs also, but size is generally the most important factor, so long as specific weight and structure are uniform, as is well known to persons skilled in this art.

Attention is directed to the fact that the flow enters the bottom of the distribution zone 28 below the sludge filter in an inward direction. Conventional, round settling or sludge filtration tanks are either built for outward or inward flow; always of course, with some vertical flow components. Each type of tank has certain advantages. Perhaps it may be said that settlers for outward flow in many instances are cheaper to construct, while settlers or sludge filtration tanks with inward flow are more efficient, especially where the initial flow passes downwardly through a peripheral zone around the ultimate settling zone. The present tank is not a conventional settler or sludge filtration tank, but a tank for concurrent sludge filtration and sedimentation. In such a tank for concurrent treatments in a single, liquid holding zone, it is particularly important to make the operation as smooth and efficient as possible. Therefore it is greatly preferred to have an inward flow into the central zone, preceded by said downward primary flow.

Reviewing once more the arrangement of the several zones, according to Figure 3, I provide four zones superposed over one another. These zones may be identified as follows, starting at the tank bottom: first, the sediment zone or bottom zone 32; second, the distribution or spiral flow zone 28 separated from the sediment zone by the baffles 33, 34; third, the sludge filter or sludge blanket zone 30; and fourth, the zone of treated and clarified water adjacent to the launder 19. The primary zone 12 may be viewed as part of the spiral flow zone 28. It will be understood that the said zones merge into one another unobstructedly, except as stated. Necessary steps of the precipitating and coagulating treatment occur in each of the zones, except the sediment zone 32 and the clear water zone. It may be said that precipitation and coagulation starts in the primary zone 12, continues in the distribution zone 28, and is completed in the sludge filter zone 30. It may also be said that a suspended sludge filter or blanket is present below and partly around the zone 30 as well as within the same. It has been shown how this sludge filter is initially built up from the bottom of the tank where it merges into a layer of sediment.

In earlier constructions, tanks somewhat similar to those of Figures 1 and 2 were proposed or used. In some instances, these were designed to be operated as simple settling tanks, requiring several hours to discharge a soft and clear water. These have very little to do with the present invention, wherein part of the sludge is kept in suspension, to provide sludge filtration and accelerated treatment. In tanks of the sludge suspending type, which were proposed heretofore and which are relatively similar to the present tank, a solid tray was provided, instead of the open or partially open zone below the sludge filter zone 30 as herein proposed. The solid tray of such an earlier tank was designed to separate an upper sludge filter zone from a lower zone for spent and settled sludge, with an extra set of sludge impelling members operating over the said tray. The present construction abolishes said solid tray, or at least the substance of it.

The present construction has a number of advantages. Among other things, the extra set of sludge impellers can be dispensed with. Various structural difficulties are eliminated. The sludge is built up from the bottom of the tank, with a quiescent, settled layer of sediment or spent sludge in the lower part, a suspended bed of active sludge in a higher part, and a zone of distribution and exchange between said parts. The sedimentation of the sludge and the release of supernatant liquid from the sediment or spent sludge is facilitated. The operation is simple and safe as soon as the initial steps have been performed whereas the said solid tray with scrapers operating thereover involved complicated and problematic flow conditions, with sludge discharge countercurrent to the liquid flow, and the like.

In certain other types of earlier apparatus, the whole of the flocs including the largest ones, and sometimes even grit or the like, were kept suspended; or at least nothing was done, short of pretreatment in a separate tank having an extra system of solids removing mechanism, to promote the segregation of the heaviest flocs from the material to be subjected to sludge filtration. Poor or fluctuating results were derived from operation where the flocculent material in the sludge filter was mixed with those heavy substances. Aside from other objections, great liquid velocities were required to suspend the heavy material, and such velocities tended to entrain flocs of small and even intermediate size, instead of merely suspending them. The situation was aggravated by the fact that the large flocs occupied space, thereby restricting the interstices available for flow of water between suspended flocculent particles. This tended further to increase the liquid velocities, and caused great difficulties when attempts were made to hold the sludge blanket in stable condition, and at a fixed upper level. An unstable sludge blanket, however, is very objectionable. All those difficulties are avoided by my improved method and apparatus.

Of course, where all flocs, including the largest, are kept suspended in a sludge blanket, they may have a certain measure of beneficial effect, in that they provide additional nuclei for the deposition of precipitates and it is sometimes possible to dispense with all sludge scrapers, by substituting certain other methods of sludge treatment and removal. These benefits, however, are generally questionable or negligible. Better precipitation and purification is generally obtained where all of the contact material consists of flocs which are readily subject to further growth under the conditions of the process. This is the case in the treatment herein proposed. Furthermore, all methods of sludge treatment and removal, eliminating the sludge scrapers, were found to be limited in application, hard of operation, and unreliable in performance. For these reasons I provide a sludge scraping device, which is much simpler, cheaper, and better, and which in and by itself is a perfectly conventional element.

In order to keep flocculent particles distributed and suspended in the sludge filter and throughout the same I may either rely exclusively on the velocity of the water being treated, as in the embodiment so far described; or I may promote the distribution and suspension of particles in and throughout the sludge filter by a closed circulation superimposed on the throughput flow or supplementing the same, at the same time however retaining the other zones as heretofore described, except possibly for minor modifications. A tank equipped for such circulation is shown in Figure 4. Here influent enters a primary peripheral channel 71, through a tangential opening 72 of the inlet conduit 73. The whole of the flow spirals down in the peripheral channel 71 and is inwardly deflected, above the tank bottom 74, by the baffle 75, which is similar in design and function to the baffle 33 as above described. Additional baffles 34 may be provided also.

A flow of water and small solids turns upward into the zone 76 for sludge filtration, towards the overflow 77, launder 78 and effluent conduit 79. The treatment in this zone is the same as above described.

In order to prevent short circuiting and insufficient treatment of this upward flow, I distribute the same as well as possible. I also provide so that I may maintain a distributing flow, and prevent complete sedimentation of the sludge filter, regardless of decreasing rates of throughput, or temporary periods during which the throughput flow ceases altogether. Thus I need not go through all of the initial steps on resuming the normal flow again. For these purposes, a part of the water and solid materials is withdrawn in or adjacent the center of the tank, by air lift means or the like, generally designated by the numeral 80.

The air lift means comprises a stationary vertical tube 81 in the center of the tank, a tube 82 having telescopic engagement with the tube 81 and being vertically adjustable with respect to it, and feeding and distributing means 83 for compressed air within the tube assembly. The adjustable tube 82 has intake openings 84 at its lower end. Otherwise, the tube assembly is substantially closed to the liquid in the sludge filtration zone 76. It may be open to the atmosphere above the liquid level established by the overflow 77 and the air lift means.

The air lift tube assembly is adapted to return a flow to the primary zone 71 by flow passages 85. These passages have tangential outlets 86 in the primary zone, discharging in the same direction as the hard water inlet 72.

A shaft 87 extends through the air lift tube assembly in the center of the tank and carries scrapers 88, for removing grit, floc conglomerates and the like from the tank bottom 74 into a central sump 89 for final disposal through the pipe 90. Vertical stilling baffles 91 in the sludge filter zone 76 may extend inwardly from the cylindrical partition wall 92 which separates the primary compartment 71 from the final sludge filter compartment 76. They may also cooperate to support the air lift tube 81.

It will be appreciated that under some conditions, the inlet openings 84 of the air lift tube must be positioned at a higher or lower point than in other cases, for best results in the process, which provides prompt sedimentation of the heavy solids, undisturbed conditions in the sediment zone below the baffle 75, and sludge filtration of the other material in the inner zone 76. An intermediate position is shown in full lines, while higher and lower positions are indicated by dotted lines. The lower position as indicated would bring the air lift inlet into or toward the sediment zone, whenever that may be desired for recirculation of a very concentrated contact material. If a relatively great amount of air is used, with the air lift in this low position, central parts of the tank bottom may be swept clean of sediment by the circulating flow. However, this will be an exception rather than the rule in the operation of this device.

A final modification is shown by Figure 5 which in general provides similar parts and operation as Figure 4 does, but wherein inlet openings 93 of the air lift tube 94 are provided in superposed rows, causing a particularly good diffusion and distribution of the circulating flow below or through the sludge filter, whereby higher rates of circulation may be provided without undue disturbance of the sludge bed. An adjustment similar to that of Figure 4 may be provided by slidable ring members 95. These ring members are concentric with the air lift tube 94, they may restrict or close some of the superposed openings 93, depending on their vertical adjustment, and they may be vertically adjustable individually or conjointly.

In operating either of the tanks of Figures 4 and 5, I build up a bed of sludge, grit, or the like from the bottom of the tank. I keep the heavy, spent sludge settled in the sediment zone, and I provide rapid sludge filtration through the flocs which are retained and suspended thereabove. This suspended sludge bed is protected from undue disturbance by the inwardly spiralling flow, previously explained. The depth and condition of the sludge bed are quite easy and simple to control, by proper adjustment of throughput flow, speed of sludge removal, and kind of circulation. The circulation can be adjusted as to its velocity, by adjustment of air feed. For this purpose, a valve 96 may be interposed on the air supply pipe 83. The circulation can be adjusted also as to the elevation of the zone through which the most critical part of the circulating flow passes, by vertical adjustment of the tube 82 or control member 95. For this last-mentioned purpose, I provide rods 97 attached to such members 82 or 95, and which rods can be raised or lowered at will, by suitable operating means (not shown). These adjustments in turn affect the character of the solids contained in the circulating flow and passing into the sludge blanket.

Various modifications other than those specifically shown and described will suggest themselves to persons skilled in the art, upon a study and consideration of this disclosure. It will be understood that the dimensions, flow velocities, and similar data specified herein are stated only for illustration, and are not intended to limit this invention.

I claim:

1. Apparatus for liquid treatment comprising a tank, a peripheral wall of said tank, an annular vertical baffle concentric with said wall and extending from a point adjacent to the top of said tank to a point above the bottom of said tank, inlet means adapted to discharge liquid to be treated into an upper part of the space formed between said peripheral wall and said annular vertical baffle, liquid outlet means adjacent to the top of said tank in the space inside said annular vertical baffle, sludge outlet means in said tank, rotary sludge conveying means in said tank adapted to move over said bottom and to convey sludge towards said sludge outlet means, a motor for said sludge conveying means, and a substantially annular baffle installed above the bottom of the tank, extending inwards from the peripheral wall of the tank to points below the lower edge of said annular vertical baffle, and allowing vertical communication between the spaces above and below said inwardly extending baffle surrounded by said annular vertical baffle.

2. Apparatus according to claim 1 comprising baffles supported by said rotary sludge conveying means in line with said inwardly extending baffle.

3. Apparatus for liquid treatment comprising a tank, a peripheral wall of said tank, an annular, vertical baffle concentric with said wall and extending from a point adjacent to the top of said tank to a point spaced from and adjacent to the bottom of said tank, thereby forming a primary treatment chamber outside of said baffle and a sludge filtration chamber inside said baffle, inlet means adapted to discharge liquid to be treated into said tank remotely from said sludge filtration chamber, liquid outlet means adjacent to the top of said tank, in said sludge filtration chamber, sludge outlet means in said tank, spaced below said liquid outlet means, rotary sludge conveyor means in said tank adapted to move over said bottom and to convey sludge towards said sludge outlet means, a motor for said sludge conveyor means, a substantially annular baffle installed above the bottom of the tank, extending inwards from the peripheral wall of the tank to points in a plane below the lower edge of said annular vertical baffle, and allowing vertical communication between the spaces above and below said inwardly extending baffle.

4. Apparatus for liquid treatment comprising a tank, a peripheral wall of said tank, an annular, vertical baffle concentric with said wall and extending from a point adjacent to the top of said tank to a point above the bottom of said tank, thereby forming a primary treatment chamber outside of said baffle, and a sludge filtration chamber inside said baffle, inlet means adapted to discharge liquid to be treated into said tank remotely from said sludge filtration chamber, liquid outlet means adjacent to the top of said tank, in said sludge filtration chamber, sludge outlet means in said tank, spaced below said liquid outlet means, rotary sludge conveyor means in said tank adapted to move over said bottom and to convey sludge towards said sludge outlet means, a motor for said sludge conveyor means, additional baffle means supported by said rotary sludge conveyor means, extending in planes substantially parallel to the bottom of the tank, and allowing vertical communication between the spaces above and below said additional baffle means.

JOHN J. FELSECKER.